United States Patent

Lee et al.

[11] Patent Number: 5,977,989
[45] Date of Patent: Nov. 2, 1999

[54] METHOD AND APPARATUS FOR SYNCHRONIZING VIDEO AND GRAPHICS DATA IN A MULTIMEDIA DISPLAY SYSTEM INCLUDING A SHARED FRAME BUFFER

[75] Inventors: William Robert Lee, Apex; Darryl Jonathan Rumph, Cary, both of N.C.

[73] Assignee: International Business Machines Corporation, Armonk, N.Y.

[21] Appl. No.: 08/922,000

[22] Filed: Sep. 2, 1997

Related U.S. Application Data

[63] Continuation of application No. 08/449,047, May 24, 1995, abandoned.

[51] Int. Cl.$^6$ ........................................................ G06F 15/16
[52] U.S. Cl. ........................... 345/503; 345/509; 345/302; 345/972
[58] Field of Search ...................................... 345/503, 501, 345/521, 522, 509, 519, 113, 114, 302, 213, 339, 332, 333

[56] References Cited

U.S. PATENT DOCUMENTS

| | | | |
|---|---|---|---|
| 4,490,741 | 12/1984 | Hornback | 348/550 |
| 4,536,683 | 8/1985 | Sutton | 315/401 |
| 4,814,872 | 3/1989 | Ivie | 250/309 |
| 4,961,071 | 10/1990 | Krooss | 345/119 |
| 4,964,069 | 10/1990 | Ely | 345/302 |
| 4,994,912 | 2/1991 | Lumelsky et al. | 348/441 |
| 5,227,863 | 7/1993 | Bilbrey et al. | 348/578 |
| 5,229,853 | 7/1993 | Myers | 348/458 |
| 5,243,447 | 9/1993 | Bodenkamp et al. | 345/133 |
| 5,347,322 | 9/1994 | Levine et al. | 348/718 |
| 5,517,612 | 5/1996 | Dwin et al. | 345/522 |
| 5,563,633 | 10/1996 | Parsons | 345/202 |
| 5,684,968 | 11/1997 | Flurry | 345/339 |
| 5,719,593 | 2/1998 | De Lange | 345/112 |
| 5,727,192 | 3/1998 | Baldwin | 345/522 |

FOREIGN PATENT DOCUMENTS 0454414  10/1991  European Pat. Off. .

*Primary Examiner*—Raymond J. Bayerl
*Assistant Examiner*—Cao H. Nguyen
*Attorney, Agent, or Firm*—Daniel E. McConnell; John B. Frisone

[57] ABSTRACT

A multimedia display system includes a central processing unit, a storage device associated with the central processing unit, a standard interface bus to which the central processing unit and the storage device are connected, a graphics processor connected to the bus for generating graphics data in response to commands from the central processor, a digitizer for converting an analog video signal to digital form and for producing synchronization signals, a video processor for processing the digitized video data to produce pixel representations of the digitized video signal, a shared frame buffer for storing the graphics data generated by the graphics processor and the pixel representations of the video signal, a device for converting the stored digital data to a data stream appropriate for driving a video monitor, and a video monitor for displaying the graphics data and the video information, wherein the video processor generates a programmable variable phase vertical synchronization signal for synchronizing video data and graphics data through a shared frame buffer with the capacity to handle relocatable windows.

8 Claims, 2 Drawing Sheets

METHOD AND APPARATUS FOR SYNCHRONIZING VIDEO AND GRAPHICS DATA IN A MULTIMEDIA DISPLAY SYSTEM INCLUDING A SHARED FRAME BUFFER

This application is a continuation of application Ser. No. 08/449,047 filed on May 24, 1995, which was abandoned upon the filing hereof.

BACKGROUND OF THE INVENTION

1. Field of the Invention

The present invention relates to data processing systems, and more particularly to multimedia data processing systems wherein graphics and video data are to be displayed simultaneously on a display monitor.

2. Prior Art

U.S. Pat. No. 4,490,741, entitled "Synchronization Signal Stabilization for Video Image Overlay", teaches a system for stabilizing the synchronization (sync) signal provided to a second video display generating a second video signal for precise overlay of a first video signal from a first video display having a relatively unstable sync signal.

Although the patent generally describes apparatus for synchronizing two video signals, it does not teach nor suggest overlaying of a video data stream and a graphics data image in a single shared frame buffer.

U.S. Pat. No. 4,961,097, entitled "Apparatus for Receipt and Display of Raster Scan Imagery Signals in Relocatable Windows on a Video Monitor", shows an interface and memory system which receives a digital raster scan image from an external source and displays the image as an inset window on a video monitor display. The input image is asynchronous with respect to the display refresh timing. The pipeline dual memory system is composed of update and display buffers.

Although the patent deals with overlaying two images on a single display monitor, the patent employs two separate buffers—an update buffer and a display buffer.

Although the patent generally describes apparatus for synchronizing two video signals, it does not teach nor suggest overlaying of a video data stream and a graphics data image in a single shared frame buffer.

U.S. Pat. No. 4,994,912, entitled "Audio Video Interactive Display", teaches a method and apparatus for synchronizing two independent rasters such that a standard T.V. video and a high resolution computer generated graphics video may be each displayed on a high resolution graphics monitor concurrently. This is accomplished by using dual frame buffers—a first T.V. frame buffer and a second graphics buffer.

Although the patent generally describes apparatus for synchronizing two video signals, it does not teach nor suggest overlaying of a video data stream and a graphics data image in a single shared frame buffer.

U.S. Pat. No. 5,227,863, entitled "Programmable Digital Video Processing System", teaches a programmable apparatus for digital processing of video signals from multiple sources converted to digital format to provide real time multiple simultaneous special video effects and suitable for direct interface to a conventional microcomputer bus. The patent also teaches means for synchronizing or "genlocking" signals from different sources for display on a single display monitor.

The patent describes a video processing subsystem that uses a synchronized pixel clock for genlocking. This technique produces a pointer artifact for a resizable, repositioned video window. This pointer artifact produced by the system according to the patent is eliminated by invention described herein.

U.S. Pat. No. 5,229,853, entitled "System for Converting a Video Signal From a First Format to a Second Format", teaches an apparatus for converting a video input signal representing an image from a first format to a prescribed second format.

The patent does not teach the merging of two separate multimedia images such as video and graphics and does not have the capability of readily handling relocatability of video windows.

Although the patent generally describes apparatus for synchronizing two video signals, it does not teach nor suggest overlaying of a video data stream and a graphics data image in a single shared frame buffer.

U.S. Pat. No. 5,347,322, entitled "Video Storage and Synchronization", teaches a video storage and synchronization system having one or more frame buffers and an output buffer providing a selectable delay. Incoming video signals are digitized and routed to the memories and/or to the buffer. Storage signals are read out from the memories in synchronism with the incoming signals and can be mixed with the incoming signals before processing in the output buffer.

The patent teaches how to synchronize a number of live video streams where the streams are always provided at a constant rate. The requirement for a constant rate is a severely limiting factor on the patent in that in many graphics display systems, update of graphics data is not always at a constant rate and cannot be handled by the system described in the patent.

Although the patent generally describes apparatus for synchronizing two video signals, it does not teach nor suggest overlaying of a video data stream and a graphics data image in a single shared frame buffer.

SUMMARY OF THE INVENTION

Therefore, it is an object of the present invention to eliminate displayed artifacts resulting from phase or frequency differences between two sources of video data in a multimedia display system having a video processor, a graphics processor and a display monitor, all controlled by a central processor, the video processor having a programmable phase adjustable synchronization signal for synchronizing video output from the graphics processor with the video output from the video processor.

Accordingly, a multimedia display system includes a central processing unit, a storage device associated with the central processing unit, a standard interface bus to which the central processing unit and the storage device are connected, a graphics processor connected to the bus for generating graphics data in response to commands from the central processor, a digitizer for converting an analog video signal to digital form and for producing synchronization signals, a video processor for processing the digitized video data, a shared frame buffer for storing a graphics data generated by the graphics processor, a device for converting the stored digital data to a data stream appropriate for driving a video monitor, and a video monitor for displaying the graphics data and the video information, wherein the video processor generates a programmable variable phase vertical synchronization signal for synchronizing video data and graphics data through a shared frame buffer with the capacity to handle relocatable windows.

It is an advantage of the present invention that two sources of data to be displayed on a video monitor may be stored concurrently in a single shared frame buffer wherein displayed artifacts are eliminated through the use of a programmable vertical synchronization signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

In the prior art, the standard technique for eliminating artifacts in a displayed image resulting from changes in data from one frame to the next, is the use of dual frame buffers where one frame buffer is being loaded with the next frame of information while a second frame buffer is being read out to the display device. This technique works very well, but requires twice as much storage for the frame buffer, duplicate control circuits, and a much higher bandwidth in the frame buffer path.

In contrast, a multimedia system in accordance with the present invention employs a single shared frame buffer wherein graphics data generated from a graphics processor under the command of a central processing unit are stored concurrently with video data such as a standard television signal in any one of a number of standard formats such as NTSC or PAL. Since the graphics data and the video data may have different frequency or phase of synchronization signals, it is required that the synchronization signals be synchronized or, as is commonly referred to in the television industry, genlocked.

Figure 1:
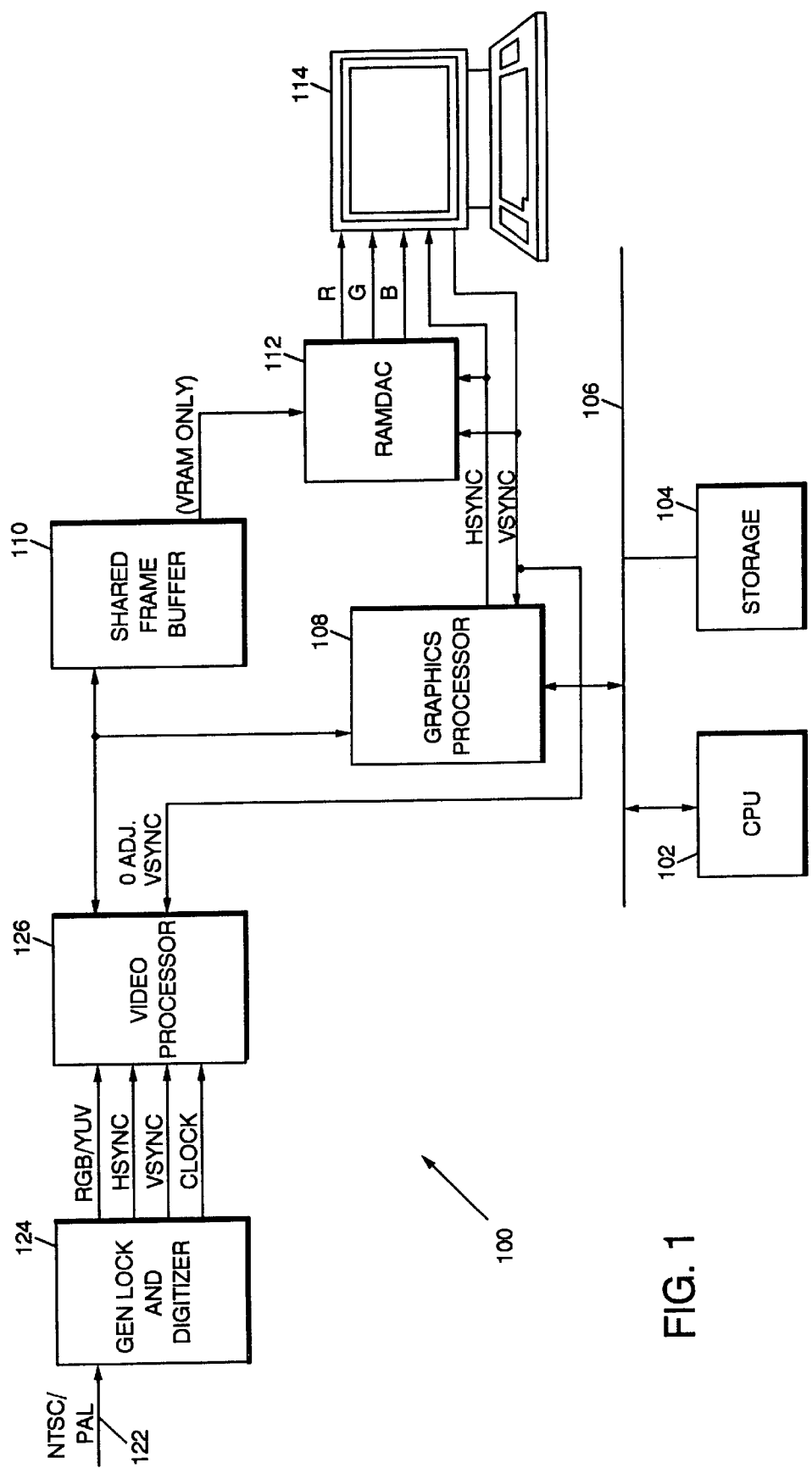
FIG. 1 is a block diagram of a multimedia system embodying the present invention.

Referring now to FIG. 1, a multimedia display system embodying the present invention will be described.

Multimedia display system 100 includes a central processing unit 102 for controlling system 100 and for generating commands for drawing graphics images on a display monitor 114 as an output of the multimedia system 100. A storage device 104 is associated with central processing unit 102 for storing instructions and data for use in the system. The central processing unit 102 and storage device 104 are connected to a system bus 106 which may be implemented as any one of a number of standard system buses such as PCI or ISA, for example.

Also attached to system bus 106 is graphics processor 108 which receives the commands from central processing unit 102 and generates pixel data representing the graphics images to be displayed. The pixel data output of graphics processor 108 is stored in shared frame buffer 110.

To produce an image on display monitor 114, data is readout from shared frame buffer 110 to a conversion device 112 which may conveniently be implemented as a RAM-DAC (random access memory digital to analog converter). Conversion device 112 generates a video stream to display monitor 114 including color and luminance data.

System 100, being a multimedia display system, typically would also have a second source of information to be displayed on display monitor 114. For example, a standard television signal 122 in a standard format, such as, NTSC or PAL format may be input to system 100 for display on monitor 114. The video signal is digitized by genlock and digitizer circuit 124 which has outputs for the color/luminance signal of the video signal, the horizontal synchronization signal, the vertical synchronization signal, and a clocking signal. Each of these signals are input to a video processor 126 which generates pixel data for presentation on display monitor 114. The pixel data output from video processor 126 is stored in shared frame buffer 110, as is the data from graphics processor 108.

Since the pixel data from video processor 126 may be running at a different clock frequency or phase than the data from graphics processor 108, there is a need to provide synchronization between the two sources of data. The synchronization between two sources of video data which are running at a different clock frequency or at the same clock frequency but at different phases, is called genlocking. Video processor 126 produces an adjustable vertical sync signal which is input to graphics processor 108 and is also driven to video monitor 114. The generation of the adjustable vertical synchronization signal will be described in greater detail with reference to FIG. 2.

Figure 2:
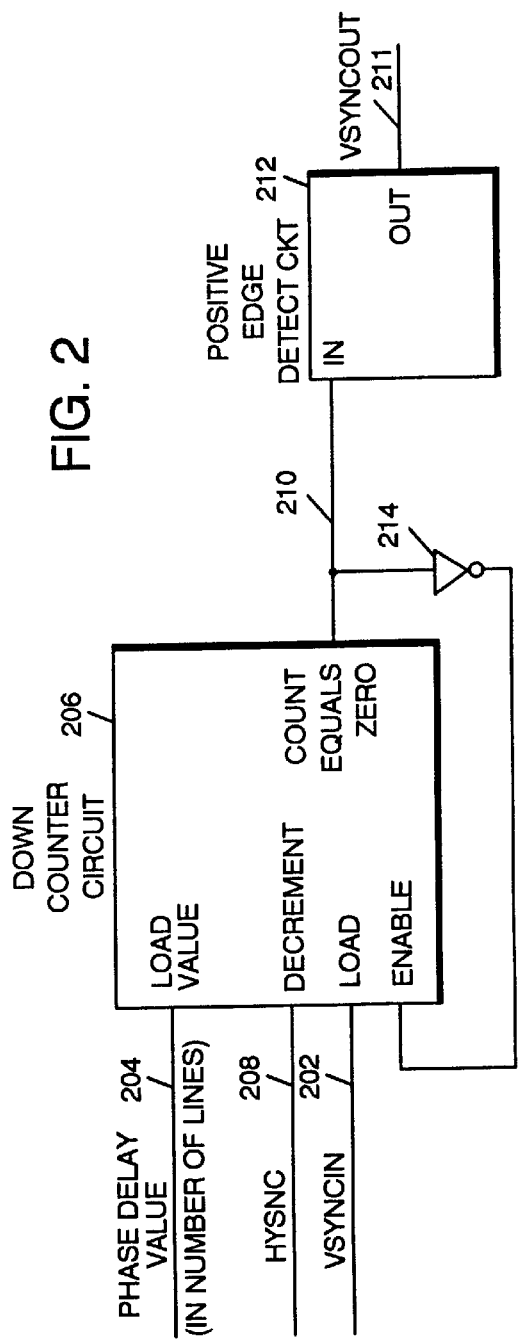
FIG. 2 is a block diagram of a programmable vertical synchronization signal generation circuit in accordance with the present invention.

Referring now to FIG. 2, the Vertical Sync In (VSYNCIN) signal 202 from video processor 126 loads the programmed phase delay value on line 204 into counter 206, and enables counter 206. Horizontal Sync (HSYNC) signal on line 208 from video processor 126 decrements the count in Counter 206 by one for each HSYNC pulse. When the count in Counter 206 reaches 0, the counter output on line 210 goes high, generating a VSYNCOUT signal on line 211 from positive edge detector circuit 212. The VSYNCOUT signal on line 211 is connected to Graphics processor 108 for synchronization of the graphics and video data. Also, when counter output on line 210 goes high, a counter disable signal is transmitted to enable input 216 through invertor 214 to reset counter 206 for a next VSYNCIN signal.

Figure 3:
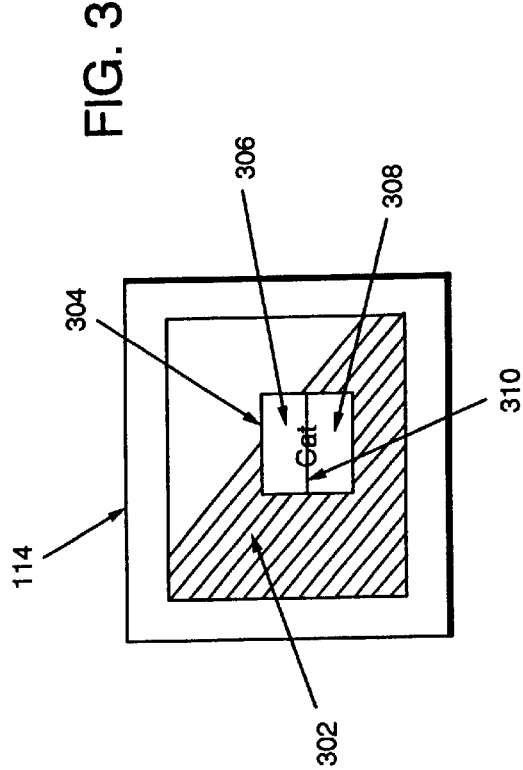
FIG. 3 is a visual representation of an undesirable artifact, which is eliminated by using the system and method of the present invention.

Referring now to FIG. 3, the visual representation of the undesirable artifact will be described.

Video monitor 114 displays graphics data in window 302 and video data in window 304. Video data 306 from frame n occupies an upper portion of window 304 and video data 308 from frame n−1 occupies a lower portion of window 304. The interface between video data 306 and video data 308 creates undesired pointer artifact 310 which is the boundary of data from the 2 video frames. The artifact is typically one pixel high and has a length equal to the length of window 304. The artifact is more noticeable with rapid video motion.

Although the present invention and its advantages have been described in detail, it should be understood that various changes, substitutions and alterations can be made herein without departing from the spirit and scope of the invention as defined by the appended claims.

What is claimed is:

1. A multimedia display system comprising:
   a central processing unit;
   a data storage device;
   a graphics processor for receiving and processing graphics data stored in the storage device under control of the said central processing unit;

a bus for interconnecting the central processing unit, the data storage device and the graphics processor;

a video processor for receiving and processing video data and for generating a programmable variable phase vertical synchronization signal;

circuitry for applying the programmable variable phase vertical synchronization signal to the graphics processor for synchronizing the frames of the graphics and video data;

a frame buffer connected to the video processor and to the graphics processor for receiving and storing a composite data frame from the processors; and, a display monitor responsive to the contents of the frame buffer means for displaying the composite video/graphics data.

2. A multimedia display system as set forth in claim 1 in which the video data are in analog form and the video processor includes a digitizer for converting the received analog video data to digital video data.

3. A multimedia display system as set forth in claim 1 in which the video processor includes:

a counter for counting a predetermined number of horizontal lines representative of a phase delay; and, a sync pulse generation circuit responsive to a predetermined count of the counter.

4. A method of operating a multimedia display system comprising the steps:

receiving and processing data signals from first and second data sources;

generating a programmable variable phase vertical synchronization signal from the first data source;

applying the generated programmable variable phase vertical synchronization signal to synchronize the data signals from the first and second sources;

storing the processed and synchronized first and second data signals in a frame buffer means; and, applying the stored contents of the frame buffer to a display monitor for display.

5. A method of synchronizing a plurality of data sources for display on a video monitor in a data processing system, according to claim 4, wherein said generating step further comprises the steps of:

storing a count representative of a predetermined phase delay between an input synchronization signal and an output synchronization signal;

counting in a counter a number of count signals to said stored count;

generating a synchronization signal output when said counter reaches a predetermined count.

6. A method of synchronizing a plurality of data sources for display on a video monitor in a data processing system, according to claim 5, wherein said counting step counts horizontal synchronization pulses.

7. A method of synchronizing a plurality of data sources for display on a video monitor in a data processing system, according to claim 5, wherein said input and output synchronization signals are vertical synchronization signals.

8. A method of synchronizing a plurality of data sources for display on a video monitor in a data processing system, according to claim 5, wherein said count represents a phase delay between said first data source and said second data source.

* * * * *